Dec. 3, 1968   C. A. EVERSMAN   3,414,018
MIXING AND DIVERTER VALVE ASSEMBLY
Filed Dec. 8, 1966   3 Sheets-Sheet 2

INVENTOR.
CARL A. EVERSMAN
BY
ATTORNEYS

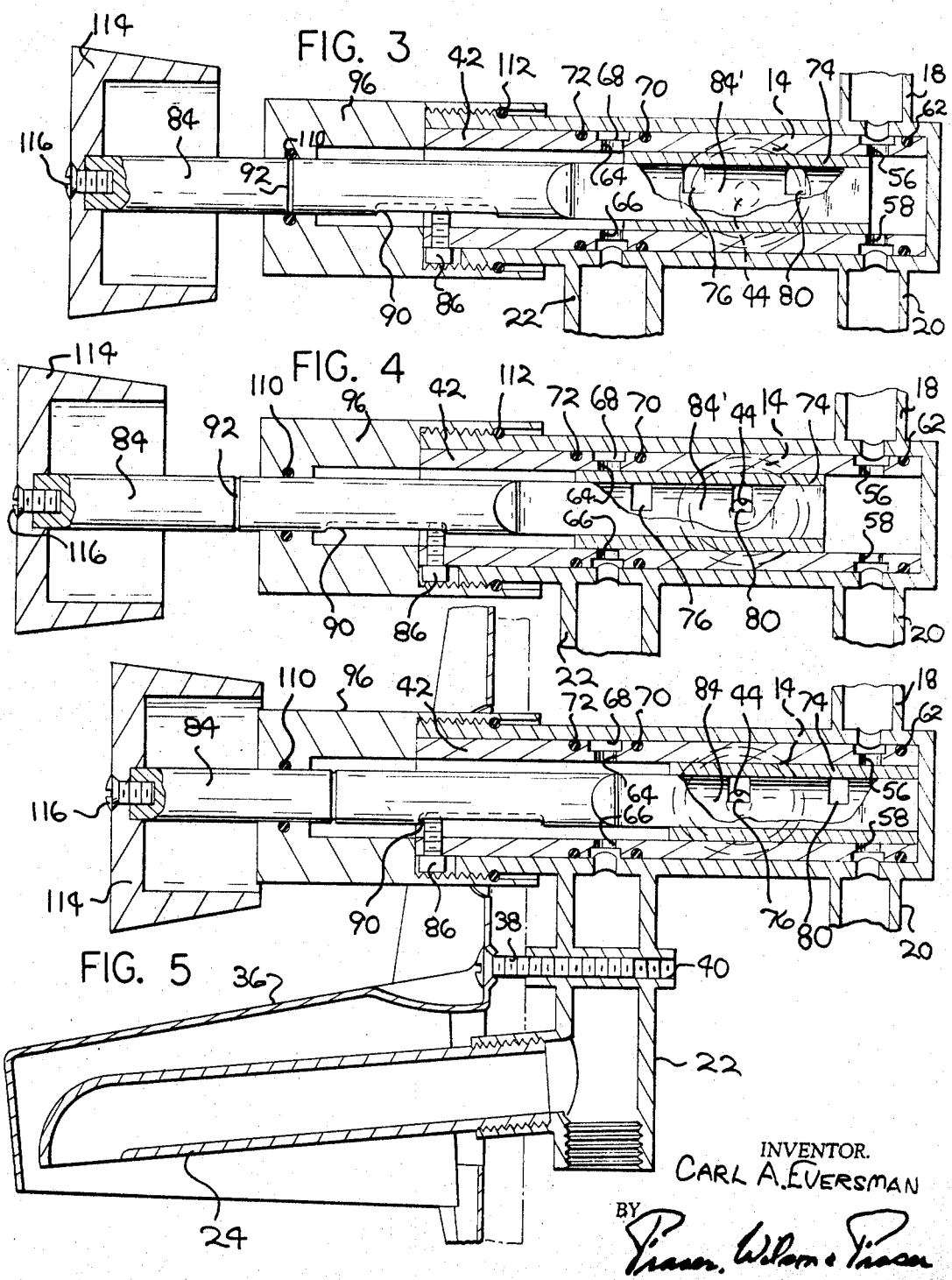

United States Patent Office 3,414,018
Patented Dec. 3, 1968

3,414,018
MIXING AND DIVERTER VALVE ASSEMBLY
Carl A. Eversman, 2943 Manchester Drive,
Toledo, Ohio 43606
Filed Dec. 8, 1966, Ser. No. 600,071
6 Claims. (Cl. 137—597)

ABSTRACT OF THE DISCLOSURE

A valve assembly for mixing and diverting fluids having a cylindrical valve piston moveable axially and rotationally within a valve cylinder and not requiring gasketing or other fluid sealing means between the relatively moving surfaces.

*Cross reference to related application*

A valve structure embodying certain of the broad concepts of the invention is illustrated and described in my copending application Ser. No. 597,956, entitled "Valve Assembly," filed Nov. 30, 1966.

*Background of invention*

(1) Field of invention.—A valve assembly comprising a fluent material branched flow line having two or more inlets or admission passages and two or more outlet or exhaust passages being joined by one or more fluent material flow lines.

(2) Description of prior art.—The prior art of valve assembly having multiple inlets and multiple outlets have typically required the employment of gasketing material between the moving parts thereof to effectively and adequately provide the necessary fluid tight sealing relationship.

*Summary of the invention*

The present invention relates to mixing and diverter valve structures and more particularly to a valve assembly having multiple inlets and multiple outlets selectively communicable with one another.

It is the primary object of the invention to produce a valve assembly having a plurality of fluid inlets through which fluids are introduced from different directions that are mixed within the assembly and then discharged through a selected one of a plurality of outlets.

The above and other objects of the invention can typically be achieved by a valve assembly which includes a main valve body having a hollow cylindrical interior and having two inlets and two outlet ports formed in the wall thereof; a valve cylinder disposed within the interior or said main valve body, the valve cylinder having a pair of inlet port means communicating with the inlet ports of the valve body respectively, and a pair of outlet port means alignable with the outlet port means of the valve body respectively, an annular groove formed around the inlet ports in the outer peripheral wall of the valve cylinder; O-ring seal means disposed in the annular grooves formed in the wall of said valve cylinder; a cylindrical valve piston disposed within the interior of the valve cylinder in fluid-tight sliding relation therewith, the valve piston having a hollow interior portion, two pairs of circumferentially spaced inlet ports formed in the valve piston and axially spaced from one another, whereby when the valve piston is moved axially to a position where one of said pairs of circumferentially spaced inlet ports thereof is aligned with the inlet port means of the valve cylinder a portion of the valve piston blocks one of the outlet port means of the valve cylinder and when the valve piston is moved axially to a position where the other of the pairs of circumferentially spaced inlet ports thereof is aligned with the inlet port means of the valve cylinder a portion of the valve piston effectively blocks the other of the outlet port means of the valve cylinder; means for effectively limiting the axial and rotational movement of the valve piston relative to the valve cylinder; and means for mounting the means for effecting limited axial and rotational movement of the valve piston in fluid-tight relation with the main valve body.

*Description of drawings*

Other objects and advantages of the invention will become readily apparent to those skilled in the art from reading the following detailed description of an embodiment of the invention when considered in the light of the accompanying drawings, in which:

FIGURE 3 is a sectional view of the valve assembly illustrated in FIGURE 1 showing the valve components in a neutral or "off" position;

FIGURE 4 is a sectional view similar to FIGURE 3 showing the valve components positioned to direct the flow of water through the posterior outlets;

FIGURE 5 is a sectional view similar to FIGURES 3 and 4 showing the valve components positioned to direct the flow of water through the forward outlets.

*Description of preferred embodiment*

Figure 6:
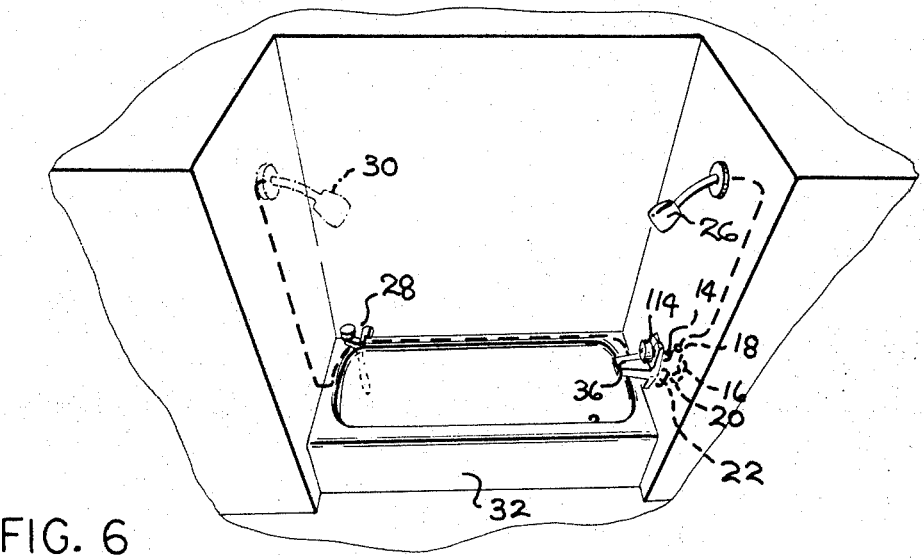
FIGURE 6 is a fragmentary perspective view of a typical bathroom installation employing the present invention.
Figure 1:
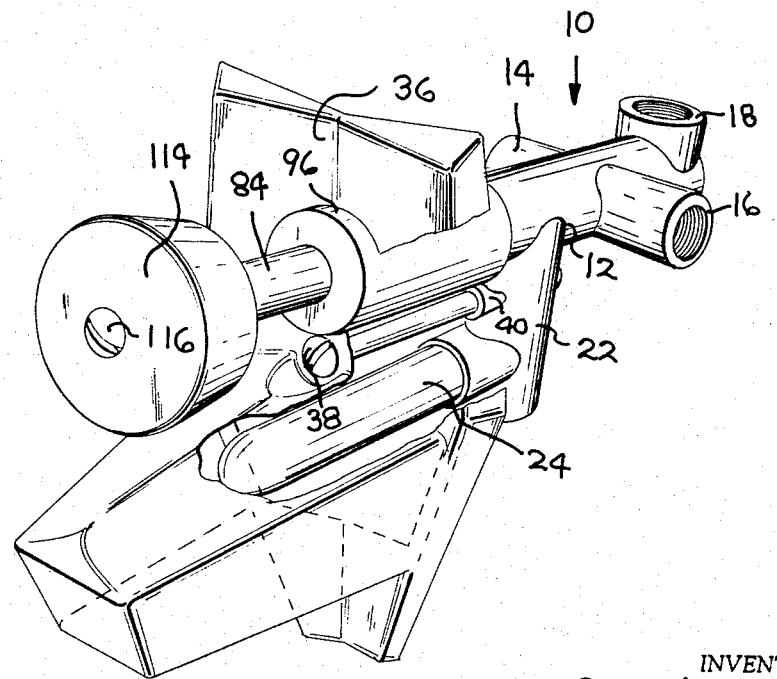
FIGURE 1 is a perspective view partially cut away of the valve assembly of the invention in an assembled form.

Referring to the drawings wherein like reference numerals designate similar parts throughout, there is illustrated a valve assembly generally indicated by reference numeral 10 having a main cylindrical body 12 with an open end and a closed end; a pair of laterally extended horizontally disposed internally threaded inlet connections 14 and 16; a pair of laterally extending vertically disposed internally threaded outlet connections 18 and 20; and a downwardly extending vertically disposed outlet connection 22 to which is connected an outlet nozzle 24. The connections 14 and 16 are typically connected to hot and cold water supplies, respectively, through conventional plumbing means, for example. The outlet connection 18 may be connected to shower nozzle 26 directly above the valve assembly as illustrated in FIGURE 6; or alternatively, the outlet 18 may be capped and the outlet connection 20 may be connected to a tub mounted spray assembly 28 or a shower nozzle 30 located at the remote end of the associated tub 32, as illustrated in FIGURE 6.

In mounting the valve assembly 10 in conventional bathroom plumbing system, the above noted plumbing connections are made and then an aperture is formed in the wall which is constructed at the end of the bathtub which typically contains a drain outlet. An externally threaded end 34 of the main cylindrical body 12 and the nozzle 24 will extend through the thus formed aperture. An ornamental fixture 36 is installed to adequately cover the wall aperture and all of the valve assembly with the exception, of course, of the external actuating mechanism which will be described in greater detail hereinafter. The fixture 36 is typically formed of a metal stamping and may be chromium plated for decorative purposes. The fixture 36 is secured to the valve assembly by a threaded fastener 38 which cooperates with an internally threaded sleeve 40 which extends through the outlet 22. As will become readily apparent from the following description, the specific thickness of the wall member behind which the valve assembly is housed may vary widely and may be readily accommodated by the amount that the threaded fastener 38 is tightened into the threaded sleeve 40.

From the above, it will be clear that the valve body 10 is securely connected to the main water supply through the connections 14 and 16 and to a number of water discharge outlets 18, 20, and 22. Since this is a permanent-type construction, it would be costly and inconvenient to remove the construction subsequent to any wearing conditions. Accordingly, it is an object of the invention to produce a valve assembly employing a fixed construction explained above which is not subjected to wear by any moving parts. To this end, there is a valve cylinder at 42 tightly fitted within the interior of the main cylindrical body 12 of the valve body 10.

The valve cylinder 42 has a pair of opposed inlet ports 44 and 46 which are caused to be in alignment with the innermost ends of the inlet connections 14 and 16, respectively. Formed in the outer peripheral surface of the valve cylinder 42, there are grooves 48 and 50 disposed concentrically about the inlet ports 44 and 46, respectively. The grooves 48 and 50 are adapted to receive O-ring seals 52 and 54, respectively, which are typically made of rubber, urethane or other resilient material and cooperate with the inner wall of the main cylinder body 12 to produce a static seal between the inlet connections 14 and 16 and the valve cylinder 42.

A pair of opposed outlet ports 56 and 58 are formed in the innermost end of the valve cylinder 42, and are arranged to communicate with the outlet connections 18 and 20 through a channel produced by a groove 60 formed concentrically about the longitudinal axis of the valve cyclinder 42 and the inner surface of the main cylindrical body 12. Adjacent the innermost end of the valve cylinder 42 there is formed a groove to receive an O-ring seal 62. To facilitate insertion of the valve cylinder 42 into the main cylindrical body 12, the innermost end of the cylinder may be bevelled or rounded.

Another pair of opposed outlet ports 64 and 66 are formed in the intermediate portion of the valve clyinder 42, and are arranged to communicate with the outlet connection 20 through a channel produced by a groove 68 formed concentrically about the longitudinal axis of the valve cylinder 42 and the inner surface of the main cylindrical body 12. To militate against any fluid seepage between the fluid flowing through the outlet ports 56 and 58, and the outlet ports 64 and 66, there is provided a groove to receive an O-ring seal 70.

To seal the outermost end of the valve cylinder 42, there is provided a groove to receive an O-ring seal 72.

Valve cylinder 42 is inserted into the main cylindrical body 12 of the valve assembly 10 and is securely maintained therein primarily by the interaction of the O-ring seals 52, 54, 62, 70, and 72, and the inner surface of the main cylindrical body 12.

A valve piston 74 having a smooth well finished outer peripheral surface is adapted to be received within the interior of the valve cylinder 42. The smooth well finished inner peripheral surface of the valve cylinder 42 and the similarly finished outer surface of the valve piston 74 cooperate to enable the piston to move axially and rotatively within the valve cylinder and provide a fluid-tight sealing fit therebetween. The piston 74 is provided with two pairs of elongate ports axially spaced from one another; the innermost pair of ports being identified by reference numerals 76 and 78, and the outermost pairs of ports being identified by reference numerals 80 and 82. Each pair of ports extends circumferentially of the valve piston 74 with their adjacent ends being preferably arcuately shaped and the opposite ends being straight and parallel to the longitudinal axis of the valve piston.

The dimensions of the valve piston 74 are such that when the pairs of ports 76 and 78 are axially aligned with the inlet ports 44 and 46, respectively, of the valve cylinder, the innermost end of the valve piston effectively blocks the outlet ports 56 and 58, while the outlet ports 64 and 66 are maintained in an open position. When the valve piston 74 is moved axially to a position where the ports 80 and 82 are axially aligned with the ports 44 and 46, respectively the outermost end of the valve piston effectively blocks the outlet ports 64 and 66, while the outlet ports 56 and 58 are maintained in an open position.

The axial and rotational movement of the valve piston 74 is effected by an actuator rod 84 which is cylindrical in cross-section for the major portion of its length with the innermost end formed as a relatively thin, flat tongue-like extension 84'. A tongue-like extension 84' is received within and securely fastened to the interior of the valve piston 74. The tongue-like extension 84' functions as a diverter partition wall to militate against the direct passage of fluid emerging from one of the ports 76 or 80 from entering the opposite ports 78 or 82, respectively, as will become readily apparent hereinafter.

The axial and rotational movement of the valve piston 74 relative to the valve cylinder 42 is limited by the co-operation between the innermost end of a set screw 86 which extends through a threaded hole 88 in the outer end of the valve cylinder 42 and a slotted zone 90 of generally rectangular shape formed in the outer peripheral surface of the actuator rod 84. Also, relative rotation of the valve cylinder 42 and the screw valve body 12 is prevented by a notch formed in the outer end of the body 12 which is adapted to receive the outer end of the set screw 86 in the assembled form.

Further, the actuator rod 84 is provided with a groove 92 which provides a position indexing function as will be explained hereinafter. The outermost end of the actuator rod 84 is provided with an internally thread hole 94.

A hollow cylindrical cap member 96 having a main body 98 and a depending skirt 100 is adapted to be mounted on the main cylindrical body 12. The internal portion of the depending skirt 100 is provided with a smooth wall section 102, and a threaded section 104 of slightly reduced diameter producing an annular shoulder 106 therebetween. The opposite end of the cap member 96 is provided with an axially extending hole 108 having a groove for receiving an O-ring seal 110. There is further provided within the interior of the hollow cap member 96 a shoulder 112 formed in slightly spaced adjacent relationship from the innermost end of the threaded portion 104. The internally threaded section 104 of the cap member 96 is threadably received by the threaded section 34 of the main cylindrical body 12 and is tightened thereon until the shoulder 106 contacts an O-ring seal 113 disposed in a groove formed in the outer surface of the main cylindrical body 12 inwardly of the threaded section 34. Also, the shoulder 112 is simultaneously caused to contact the outer annular surfaces of the main cylindrical body 12 and the valve cylinder 42.

In the assembled form, the actuator rod 84 extends in fluid-tight sealing relation within the O-ring seal 110 of the cap member 96 and extends outwardly therefrom to receive a handle 114 which is securely fastened thereto by a screw 116 which extends within the threaded hole 94 of the actuator rod 84.

Figure 2:
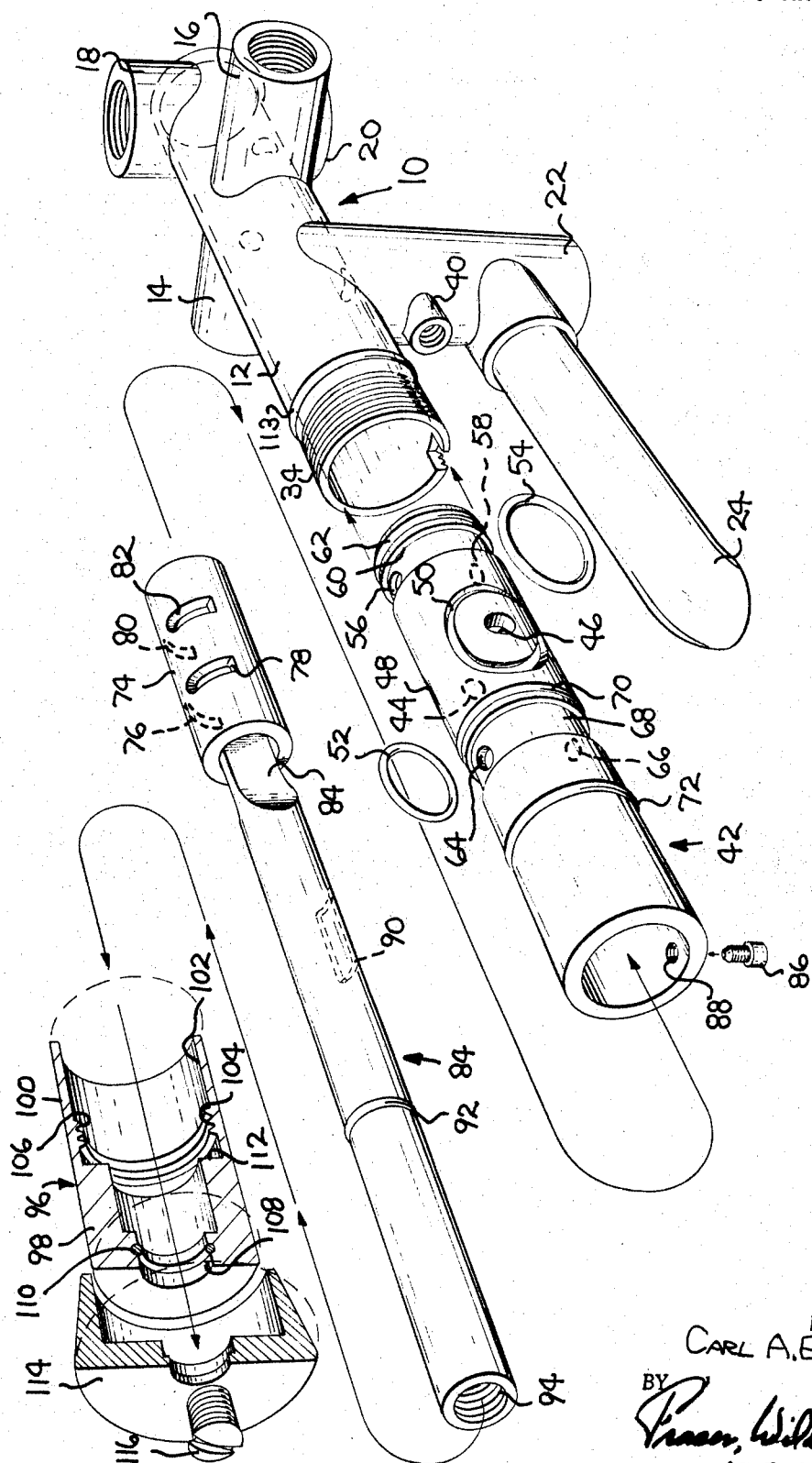
FIGURE 2 is an exploded perspective view of the valve assembly of the invention.

In operation, the actuator handle 114 is moved from its normally closed or "off" position (illustrated in FIGURE 3) outwardly to simultaneously move the valve piston 74 axially within the valve cylinder 42 until the innermost end of the slot 90 contacts the inwardly projecting end of the setscrew 86, as illustrated in FIGURE 4. In this position, the inlet ports 80 and 82 of the valve piston 74 are in alignment with the inlet ports 44 and 46, respectively of the valve cylinder 42. The position of the components illustrated in FIGURE 4 allows a balanced flow of fluid from the inlet ports 14 and 16 to enter the interior of the valve assembly 10. Since in this position the outlet ports 64 and 66 are blocked by the outer end of valve cylinder 74 and the outlets 56 and 58 are open, the fluid may satisfactorily be discharged through either of the outlets 18 and 20. In most actual installations, one of the outlets 18 or 20 will be capped allowing fluid to be discharged only through the other. The amount of the fluid permitted to enter the valve assembly through the respective inlets 14 and 16 is controlled by rotational movement of the actuator handle 114 and the associated valve piston 74. It will be noted that by rotating the actuator handle 114 in a clockwise direction (as viewed in FIGURE 2), the amount of fluid entering the assembly through the inlet 14 will be decreased while the amount of fluid entering through the inlet 16 will be increased. So long as the axial position of the valve piston 74 remains constant, the total volume of the fluid discharged from the assembly will be constant. The volume of the transient fluid may be varied by axial movement of the actuator handle 114 and the valve piston 74 which acts to change the total area of the passage through the inlets 14 and 16 and the respective inlet ports 80 and 82. In the position of the components illustrated in FIGURE 4, the fluid flow is at a maximum quantity which may be decreased by axially moving the actuator handle 114 and the associated valve piston 74 inwardly a slight amount.

Now, if it is desired to discharge the fluid through the outlet 22, for example, the actuator handle 114 is moved to the position illustrated in FIGURE 5 wherein the outermost end of the slot 90 contacts the inwardly projecting end of the setscrews 86. In this position the inlet ports 76 and 78 of the valve piston 74 are in maximum alignment with the inlets 14 and 16 allowing a maximum volume of fluid to enter the system and be discharged through the outlet ports 64 and 66, through the channel 68 into the outlet 22 and thence to the nozzle 24. The relative amounts of fluid entering the system from the inlets 14 and 16 may be varied by rotational movement of the actuator handle 114 and the valve piston 74, while the volume of fluid may be decreased by slight outward axial movement thereof.

When it is desired to turn off of the fluid flow, the actuator handle 114 is moved axially until the groove 92 registers with the O-ring element 110, indicating to the operator that the system is in an "off" position. In use, the operator would typically initially move the actuator handle to the position indicated in FIGURE 5 wherein the fluid is caused to be discharged through the nozzle outlet 24, adjust the fluid discharged to the desired temperature, and finally pull the actuator handle outwardly to divert the flow of fluid through the shower outlet which may be either the outlet 18 or 20.

It will be understood from the above description that the only wear which could occur in the system would be between the valve cylinder 42 and the relatively moving valve piston 74 and thus the main plumbing fixtures are not subjected to wear during the operation of the valve components. Should the internal component of the valve assembly need repair or renewal, the valve piston 74 and/or the valve cylinder 42 may be withdrawn and repaired or replaced.

The valve assembly produced in accordance with the present invention has a number of practical advantages from the installation standpoint. The initial or rough plumbing installation is made by making the plumbing connection to the inlets 14 and 16, and the outlets 18 and 20. The open end of the main cylindrical body 12 and the outlet end of the nozzle 24 are plugged or sealed in some other fashion to satisfactorily protect the assembly from dirt, plaster or other foreign material which is normally present during construction. The lathers, plasterers, and tile setters then complete their portion of the construction leaving only a single aperture or opening around the outer end of the main cylindrical body 12 and nozzle 24. The final assembly is accomplished by the finish plumbers who unplug the main cylindrical body 12 and the nozzle 24 and install the fixture or shroud 36, the valve cylinder 42, the valve piston 74, the cap member 96, and the actuator handle 114. The thickness of the associated wall through which the main cylindrical body 12 and the nozzle 24 extend is not critical so long as the nozzle 24 extends therethrough. The shroud member 36 which adequately covers the wall aperture and the associated interior plumbing may be adjusted through nearly the full length of the cap member 96.

According to the provisions of the patent statutes, I have explained the principles and mode of operation of my invention and have illustrated and described what I now consider to represent its best embodiment. However, I desire to have it understood that, within the scope of the appended claims, the invention may be practiced otherwise than as specifically illustrated and described.

What I claim is:

1. A mixing and diverter valve assembly for selectively diverting fluid from a fluid source to at least two remote outlets comprising:
    a main valve body, said body having a hollow cylindrical interior and having two inlet and two outlet ports formed in a wall thereof;
    a valve cylinder disposed within the interior of said main valve body, said valve cylinder having a pair of inlet port means communicating with the inlet ports of said valve body respectively, and a pair of outlet port means alignable with the outlet ports of said valve body respectively, an annular groove formed around the inlet ports in the outer peripheral wall of said valve cylinder;
    an O-ring seal disposed in each of the annular grooves formed in said valve cylinder;
    a cylindrical valve piston disposed within the interior of said valve cylinder in fluid tight sliding relation therewith, said valve piston having a hollow interior portion and being open at each end thereof, two pairs of circumferentially spaced inlet ports formed in said piston and axially spaced from one another whereby when said valve piston is moved axially to a position where one of said pairs of circumferentially spaced inlet ports thereof is aligned with the inlet port means of said valve cylinder a portion of said valve piston blocks one of the outlet port means of said valve cylinder and when said valve piston is moved axially to a position where the other of said pairs of circumferentially spaced inlet ports thereof is aligned with the inlet port means of said valve cylinder a portion of said valve piston effectively blocks the other of the outlet port means of said valve cylinder;
    means for effecting limited axial and rotational movement of said valve piston relative to said valve cylinder; and
    means for mounting said means for effecting limited axial and rotational movement of said valve piston in fluid tight relation with said main valve body.

2. The invention defined in claim 1 including gasket means disposed circumferentially about said valve cylinder at spaced intervals to effectively militate against the seepage of fluid between said outlet ports thereof.

3. The invention defined in claim 2 including a partition wall fixedly secured to extend axially within the interior of said valve piston to extend between the inlet ports of said pairs.

4. The invention defined in claim 3 wherein means for effecting limited axial and rotational movement includes an actuator rod having one end forming at least a portion of said partition wall and the other end extending outwardly therefrom in fluid-tight sliding relation through said means for mounting said means for effecting limited axial and rotational movement of said valve piston.

5. The invention defined in claim 4 wherein said actuator rod is provided with an indexing means for indicating when said valve piston is in a blocking relation relative to the inlet port means of said valve cylinder.

6. The invention defined in claim 5 wherein said indexing means includes an annular groove formed in said actuator rod cooperating with an annular O-ring disposed within said means for mounting said means for effecting limited axial and rotational movement of said valve piston.

References Cited

UNITED STATES PATENTS

| | | | |
|---|---|---|---|
| 2,847,027 | 8/1958 | Kumpman | 137—597 |
| 3,105,519 | 10/1963 | Fraser | 137—636.4 XR |
| 3,232,308 | 2/1966 | Moen | 137—597 XR |
| 3,245,430 | 4/1966 | Enterante | 137—597 XR |
| 3,285,278 | 11/1966 | Corlett | 137—636.4 XR |
| 3,286,720 | 11/1966 | Mongerson | 137—636.4 XR |

DONALD E. WATKINS, *Primary Examiner.*